United States Patent [19]
Masson et al.

[11] Patent Number: 5,623,412
[45] Date of Patent: Apr. 22, 1997

[54] INSTANTANEOUS DATA ACQUISITION AND PROCESSING SYSTEM FOR INTERNAL-COMBUSTION ENGINE CONTROL

[75] Inventors: Olivier Masson; Philippe Pinchon, both of Rueil-Malmaison; Michel Rivaud, Puteaux, all of France

[73] Assignee: Institut Francais du Petrole, Rueil Malmaison, France

[21] Appl. No.: 321,794

[22] Filed: Oct. 12, 1994

[30] Foreign Application Priority Data

Oct. 12, 1993 [FR] France ................................. 93 12251

[51] Int. Cl.$^6$ ............................ F02D 35/02; G01L 23/22
[52] U.S. Cl. ............................... 364/431.03; 364/431.04; 364/431.08; 123/419; 123/425; 123/435
[58] Field of Search ......................... 364/431.03, 431.04, 364/431.05, 431.08; 123/425, 416, 419, 414, 417, 435; 73/115, 116, 117.3

[56] References Cited

U.S. PATENT DOCUMENTS

| | | | |
|---|---|---|---|
| 4,111,041 | 9/1978 | Rice | 73/115 |
| 4,178,541 | 12/1979 | Brihier | 324/385 |
| 4,331,029 | 5/1982 | Wilson | 73/117.3 |
| 4,384,480 | 5/1983 | Krage et al. | 73/116 |
| 4,598,680 | 7/1986 | Lanfer | 123/425 |
| 4,638,780 | 1/1987 | Trinh et al. | 123/416 |
| 4,653,315 | 3/1987 | Ament et al. | 73/117.3 |
| 4,875,450 | 10/1989 | Yoshikawa et al. | 123/425 |
| 5,076,098 | 12/1991 | Miwa | 73/115 |
| 5,107,813 | 4/1992 | Inoue et al. | 123/425 |
| 5,229,945 | 7/1993 | DeMizu et al. | 364/431.04 |
| 5,284,114 | 2/1994 | Fukui | 123/414 |

FOREIGN PATENT DOCUMENTS

| | | |
|---|---|---|
| 4020681 | 1/1991 | Germany . |
| 4113582 | 11/1991 | Germany . |
| 4241683 | 6/1993 | Germany . |

OTHER PUBLICATIONS

Patent Abstracts of Japan, vol. 15, No. 8, Jan. 9, 1991, Japanese 02 259 251 (Fuji Heavy Ind. Ltd.).
Patent Abstracts of Japan, vol. 8, No. 154, Jul. 18, 1984, Japanese 59 051 135 (Toyota Jidosha KK).

*Primary Examiner*—Kevin J. Teska
*Assistant Examiner*—Tan Nguyen
*Attorney, Agent, or Firm*—Antonelli, Terry, Stout & Kraus, LLP

[57] ABSTRACT

The control system of the invention is associated with an engine provided with means for measuring one or several parameters including pressures (in the cylinder, induction pressure, exhaust pressure) for each cylinder, acceleration, injection needle lift, knock detection, engine torque, etc., and with means for the angular coding of the crankshaft position. The control system includes a synchronization set (7) co-operating with angular discrimination means so as to readjust automatically at any time the angular coding data with respect to the combustion cycles. An acquisition set digitizes at a high frequency the various data measured, and notably the pressure values taken during each cycle, simultaneously in all the cylinders. A processing set (18) including notably a fast digital processor suited for determining in real time complex physical parameters such as the man indicated pressure (PMI) at each cycle or each engine revolution, stability factors of these parameters in time, etc. The results obtained are applied to a control computer (19) suited for determining and optimizing various engine parameters such as fuel injection, advanced ignition, etc.

11 Claims, 10 Drawing Sheets

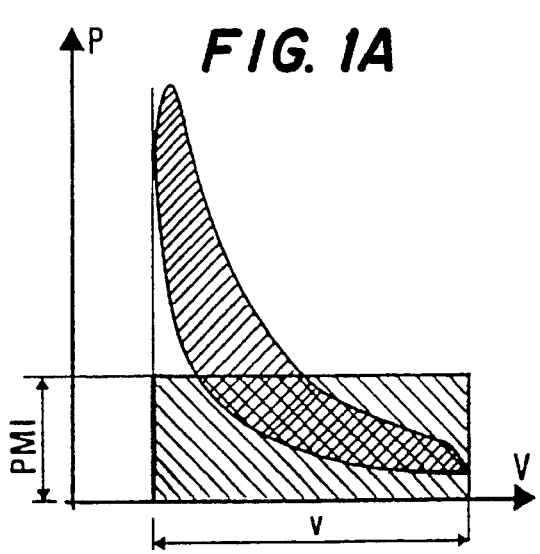
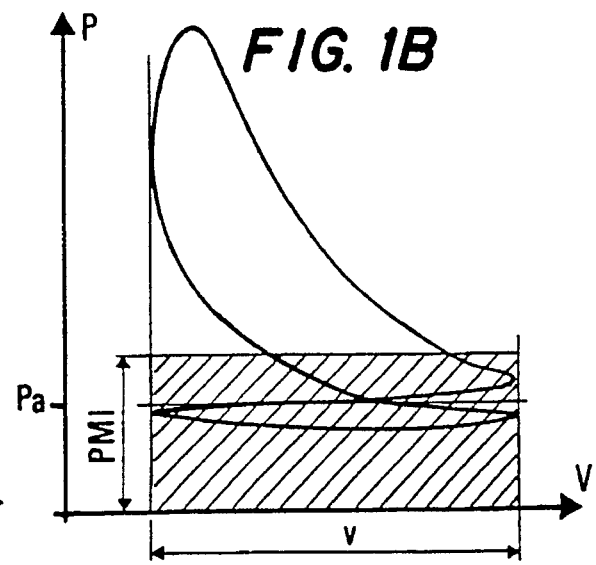
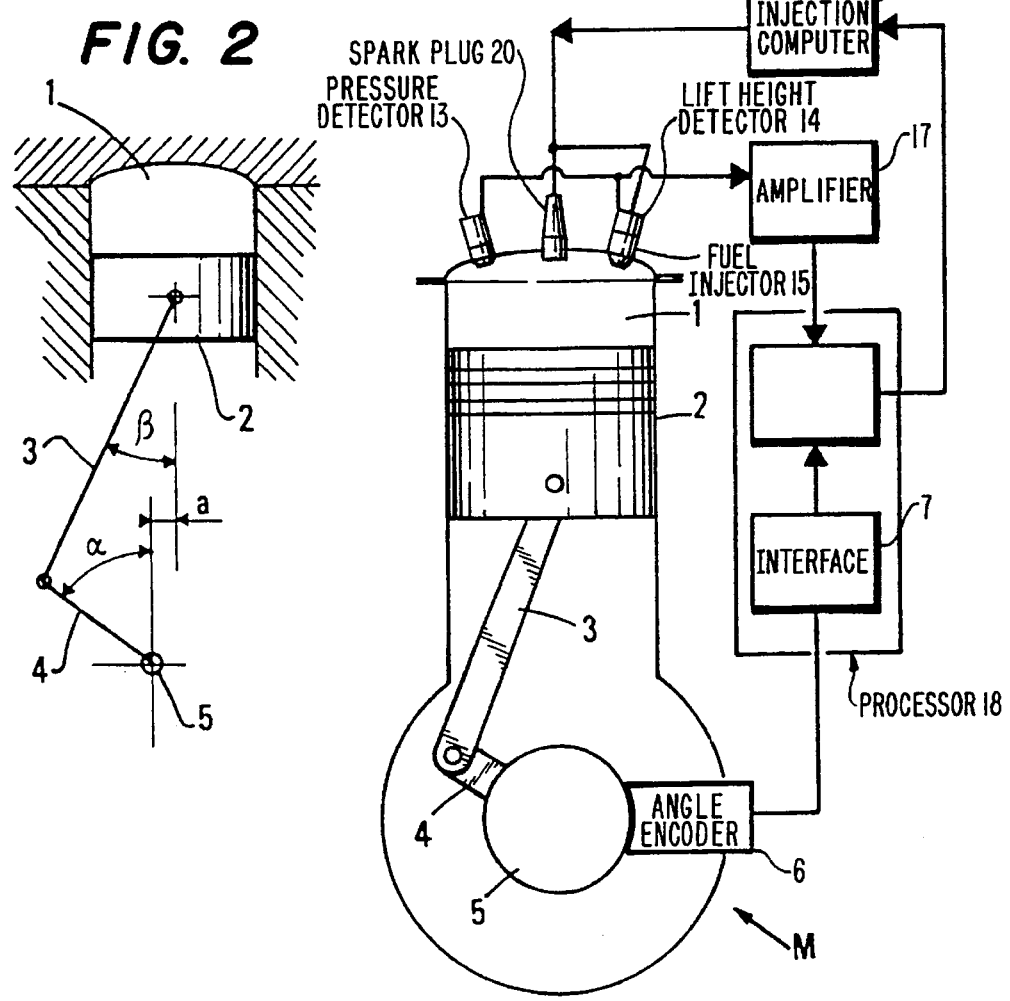

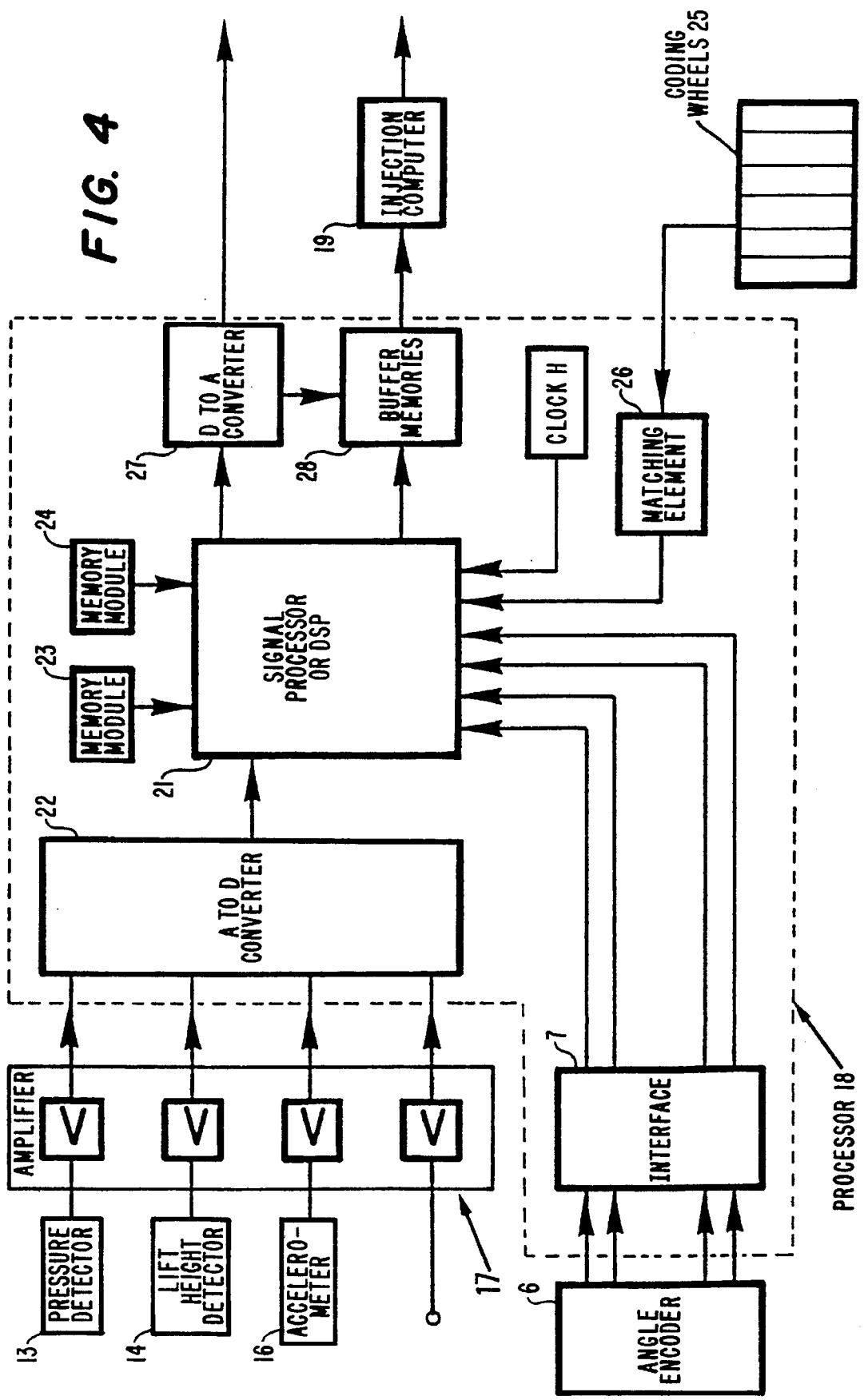

(ABSOLUTE ANGULAR LOCATION OF A 4-STROKE ENGINE)

(ABSOLUTE ANGULAR TIMING (ADJUSTMENT) OF A 2-STROKE ENGINE)

(DETERMINING OF $P_{MAX}$ HP AND $P_{MAX}$ LP OF A 4-STROKE ENGINE)

(DETERMINING PARAMETERS MiP, MiP$_{HP}$, MiP$_{LP}$ OF A 4-STROKE ENGINE)

(DETERMINATION OF $P_{MAX}$ ON A 2-STROKE ENGINE)

(DETERMINATION OF MIP (PMI) ON 2-STROKE ENGINE)

INSTANTANEOUS DATA ACQUISITION AND PROCESSING SYSTEM FOR INTERNAL-COMBUSTION ENGINE CONTROL

BACKGROUND OF THE INVENTION

1. Field of the Invention

The present invention relates to a control system for optimizing instantaneously (in real time) the working point of a four-stroke internal-combustion engine through real time processing of parameters indicative of the running thereof, such as the pressure prevailing in the various combustion chambers at a series of successive times of each combustion cycle, the engine speed, etc, and for controlling optimum fuel injection, ignition, valve timing adjustments, etc.

The invention may be used in research laboratories to design control systems for automobile engines and may be integrated in the control systems of high-performance engines within a vehicle.

2. Description of the Prior Art

It is well-known to associate one or several detectors with an engine for measuring several parameters so as to control the running thereof better. These detectors may be accelerometers for detecting knocking, pressure detectors for measuring the pressure inside the chambers or in the induction and the exhaust pipes, temperature detectors, injection needle lift detectors, etc.

It is also well-known to apply predetermined adjustments to an engine by means of a computer, by relating the indications provided by the detectors to stored type configurations. Many detectors are necessary and complex type configuration charts relating to very diverse running conditions have to be "mapped" in order that this process is efficient.

Control may be improved if in real time the values of some complex parameters representative of the instantaneous running conditions of an engine are defined.

This is notably the case of the mean indicated pressure (PMI) which provides a direct indication on the useful work of the gases during a combustion cycle and allows comparisons to be drawn between different engines.

It is also the case of another parameter ST which defines the stability in time of the PMI and provides information on the combustion regularity.

It is known that, in a two-stroke or a four-stroke internal-combustion engine, the useful work from the gases (or indicated work) for a cycle may be obtained by measuring (for example by plotting) the area of a diagram P/V (FIGS. 1A, 1B) recorded for the engine, or by computing on an engine cycle the relation:

$$W = \int p \, dV = \int F \, dl = \int pS \, dl \tag{1}$$

where F is the force exerted by the gases on each piston, p is the pressure prevailing in the combustion chamber, dV is the volume variation of the chamber, dl is the corresponding displacement of the piston and S is the projected surface thereof.

The PMI is defined as the constant pressure which would provide the same indicated work Wi per cycle when applied to the piston during the total expansion stroke thereof:

$$Wi = PMI.S.l$$

The PMI is obtained, as it is known to specialists, through the relation:

$$PMI = \frac{1}{V_T} \cdot \int_V P(V) \cdot dV \tag{2}$$

where P(V) is the pressure measured as a function of volume V, $V_T$ is the volume swept by the piston during its travel between the bottom dead center PMB and the top dead center PMH.

In FIG. 2, the parameters referred to therein are: $\alpha$ the angle formed by crank 4 with the axis of cylinder 1, B the angle formed by the length of connecting rod 3 and the axis of the cylinder, a the offset of piston 2 with respect to the axis of crankshaft 5, m/2 the length of the crank 4, and $V(\alpha)$ the volume variation of the combustion chamber when the crank sweeps angle $\alpha$ up to the top dead center.

By expressing the variation in volume as a function of $\alpha$, relation (2) may also be expressed as follows:

$$PMI = \frac{1}{V_T} \cdot \int_V P(\alpha) \cdot \left( \frac{dV(\alpha)}{d\alpha} \right) \cdot d\alpha \tag{3}$$

A simple calculation shows that, by taking the previous designations into account, the previous expression may be written in the following form:

$$PMI = \frac{\pi}{360} \cdot \int_\alpha P(\alpha) \cdot \left( \sin\alpha + \cos\alpha \cdot \frac{\eta}{\sqrt{1-\eta^2}} \right) \cdot d\alpha \tag{4}$$

where h-sin $\beta$=a/B+m sin/2B.

The stability factor ST of the value PMI is obtained from a collection of n values PMI successively obtained and stored (n=100 or 1000 for example), and it is established by applying the following relation:

ST=standard deviation of PMI/mean value of PMI, this factor being established from the collection of values obtained.

Knowledge of the values PMI of an engine is for example used for determining the optimum advanced ignition AA° allowing predetermined criteria to be met.

A first criterion may consist in obtaining a minimum indicated specific fuel consumption (I.S.C.) or a maximum engine torque.

A second criterion may consist in minimizing the most polluting fractions of the burnt gases such as Nox. The optimum advanced ignition AA° selected depends here directly on the value found for the stability factor ST.

A third criterion may for example consist in ensuring the maximum stability of the engine torque.

To perform these calculations, it is possible to use a computer programmed to compute the PMI and the factor ST values from a set of discrete pressure measurements obtained at successive times of a single cycle. Computations may be carried out in real time simultaneously for all the cylinders, but, the following criteria are used A relatively low sampling frequency of the measured pressures is selected, which leads to rather approximate values of the previous pressure PMI and factor ST Alternatively, the pressure samples measured in the various cylinders have to be acquired successively by multiplexing, which leads to decreasing the number of values PMI obtained.

In both cases, the limitations imposed by insufficient acquisition and computing speeds adds considerably uncertainty to the actual values PMI and on their stability factor ST, which reduces the possibilities of an efficient running control of engines, and interferes with the development of control techniques, notably if vehicles are to be equipped with such systems.

SUMMARY OF THE INVENTION

The data acquisition and processing system according to the invention allows, by real time determination of physical parameters, the optimizing the running of a two-stroke or four-stroke internal-combustion engine including at least one combustion chamber having a cylinder and a piston, detecting means for measuring at least the pressure variations in the chamber and angular coding means producing pulses indicative of the angular variations of the crankshaft and cycle synchronization pulses at each revolution thereof, including storage means for storing data relative to specific engine parameters, and angular locating means for applying, to the processing set, initial data relative to the position of the synchronization pulses (Sy) with respect to the top dead center of the piston. The system includes:

- shaping means for delivering angle increments at fixed angular intervals, whatever the value of the angle increments delivered by the angular coding means (6);
- a measuring signal acquisition set including means for the simultaneous acquisition of the variations of the pressure measured in all the combustion chambers and at each cycle; and
- a processing set including a digital processor in cooperation with a shaping means, an angular locating means and the acquisition set, for locating automatically the real angular position of the crankshaft within each cycle, by reference to the pressure measurements in the chamber, and for phasing the synchronization pulses (Sy) with the pulses from the shaping means.

The processing set is suited for example for determining in real time the PMI in each of the cylinders, from a set of instantaneous pressure values acquired during each cycle, as well as ST of this mean indicated pressure in each of the cylinders from a set of successive values thereof.

According to an embodiment, the acquisition set includes several inputs for collecting signals coming from pressure detecting means associated with several cylinders, and the processing set is suited for determining in real time and sequentially the PMI in all the cylinders.

According to another embodiment, the acquisition set includes several inputs for collecting simultaneously signals coming from detecting means such as those generally associated with engines for controlling the running thereof, and notably detectors suited for measuring one or several ones of pressures in each cylinder, induction and exhaust pressures, injection needle lifts, accelerations, temperatures, engine torque, etc, or for detecting knocking, and the processing set determines in real time and simultaneously the PMI in each of the cylinders.

The system according to the invention preferably includes a control device for determining the optimum running parameters of the engine as a function of the complex parameters and for controlling the running thereof.

According to an embodiment, the shaping means include a dividing element provided with means for adjusting the division factor and a phase changing element, the dividing element and the phase changing element co-operating to produce angular increments at an angular frequency submultiple of that of the angular increments coming from the angular coding means, and synchronous with the synchronization pulses (Sy).

According to an embodiment, the processing set automatically offsets the value of the crankshaft angle as a function of the detection time of the maximum pressure (PMAXHP) measured in the combustion chamber.

The storage means include for example a storage unit for storing the predetermined volume variations of each combustion chamber as a function of the angle of rotation ($\alpha$) of the crankshaft.

The processing set is suited for example for determining in real time and for each of the cylinders one or several of PMI on each combustion cycle, PMIHP and PMIBP respectively on the high-pressure and low-pressure parts of each combustion cycle, measured respectively during each of the maximum pressure cycle parts, and the respective stability factors ST of these complex parameters, which may be possibly done for each of the combustion chambers of the engine.

According to an embodiment, the processing set is suited for positioning automatically the high-pressure cycle parts by reference to the maximum pressure measured in each combustion chamber, whether it is a two-stroke or a four-stroke type engine.

On account of its structure, the system according to the invention is highly advantageous.

The invention can provide in real time, every time the angle of rotation of the crankshaft has varied by a small and fixed increment (1° CA or a fraction of a °CA for example), one or several complex parameters such as the mean indicated pressure PMI of a complete combustion cycle, and in case of a four-stroke engine, separately the value PMI of the high-pressure (HP) and low-pressure (BP) parts of each cycle, the maximum pressure, the stability coefficient ST of the previous parameters on a certain number of successive cycles, etc.

The invention can control a control element (an injection computer for example) from the values computed previously, which allows the running of the engine to be easily optimized at any time.

The frequency modification of the pulses delivered by the angle encoder allowed by the shaping and the angular locating means is particularly useful in research laboratories for determining the sufficient sampling frequency for estimating the value PMI within the scope of the design of an injection computer equipped with this system.

The shaping and the angular locating means also allow automatic synchronization, at any time, of the pulses delivered by the angle encoder, by reference to the running cycle of the engine (high-pressure or low-pressure cycle). The system may thus be used with any coding means and it may also remove automatically any ambiguity and any error about the value of the angle of rotation of the crankshaft as soon as the engine is started.

This advantage is all the more significant since it may be confirmed in practice the value of complex parameters such as the mean indicated pressure PMI for example, which are the basis of the optimization of the running of an engine, which are likely to vary because of angle locating errors. As a 1/10th degree error in the angle of rotation of the crankshaft (°CA) with respect to its real position for example may be translated into a considerable variation of the mean indicated pressure of an engine (up to 10% and more in some cases), using the system according to the invention guarantees improved reliability of the results.

The invention further relates to a process for optimizing the running of a two-stroke or four-stroke internal-combustion engine as defined previously.

The optimizing process comprises:

shaping pulses (ai) in order to deliver angle increments at determined angular intervals, whatever the value delivered by the angular coding means;

locating the position of the synchronization pulses (SY) with respect to the top dead center (PMH) of the piston, readjusting automatically angular pulses generated by the angular coding means in order to provide agreement with an effective part of the combustion cycle in which they are emitted, determining in real time, during each cycle and for each of the chambers, several complex parameters including at least values of the mean PMI and ST of the PMI providing mappings including the complex parameters; and controlling the engine in order to have, on the one hand, an indicated specific consumption or a maximum engine torque, and on the other hand a minimum rate of harmful discharge in the exhaust gases of the engine.

BRIEF DESCRIPTION OF THE DRAWINGS

Other features and advantages of the control system according to the invention will be clear from reading the description hereafter of embodiments given by way of non limitative examples, with reference to the accompanying drawings in which:

FIGS. 1A and 1B schematically show a diagram of the pressure variation prevailing in a cylinder as a function of the volume of the combustion chamber in the case of a two-stroke engine and in the case of a four-stroke engine;

FIG. 2 is a simplified diagram illustrating the method for calculating the mean indicated pressure PMI;

FIG. 3 is a flowsheet showing an engine associated with the optimization system according to the invention;

FIG. 4 schematically shows the structure of the control system according to the invention;

DESCRIPTION OF THE PREFERRED EMBODIMENTS

The control system described hereunder allows computing in real time many physical parameters necessary for optimizing the running of an engine, notably according to the angular variation of the crankshaft located by a coding element.

Since an incremental type angle encoder is preferably used, the previous relation (4) is exploited in the form:

$$PMI = \frac{\pi}{360} \cdot \sum_{i=0}^{i=\frac{180 \times \text{type}}{\text{resolution}} - 1} P(i) \cdot \qquad (5)$$

$$\left( \sin\alpha + \cos\alpha \cdot \frac{\eta}{\sqrt{1-\eta^2}} \right)$$

where type is a number equal to 2 for a two-stroke engine and 4 for a four-stroke engine.

In order to minimize the computing time, the PMI is expressed as a sum of products of values in two tables of values, one comprising n pressure values P(i) measured during each cycle at the angular incrementation times ti, the other consisting of a predetermined list of the values taken by the factor T(i) proportional to the derivative of volume V with respect to the crank angle, i.e.:

For a two-stroke engine:
$$PMI = \sum_{i=0}^{i=\frac{360}{\text{resolution}}} P(i) \cdot T(i) \qquad (6)$$

For a four-stroke engine:

$$PMI = \sum_{i=0}^{i=\frac{360}{\text{resolution}}} P(i) \cdot T(i) + \sum_{i=\frac{360}{\text{resolution}}}^{i=\frac{720}{\text{resolution}} - 1} P(i) \cdot T\left(i - \frac{360}{\text{resolution}}\right) \qquad (7)$$

The different values of T(i) are computed beforehand as a function of the geometry of the engine and the resulting table is stored in the memory. Computation of the mean indicated pressure PMI is thus carried out by summation of products between corresponding terms of a set table T(i) and a table P(i) continuously updated according to the variations of the pressure measured in the cylinders.

Figure 5:
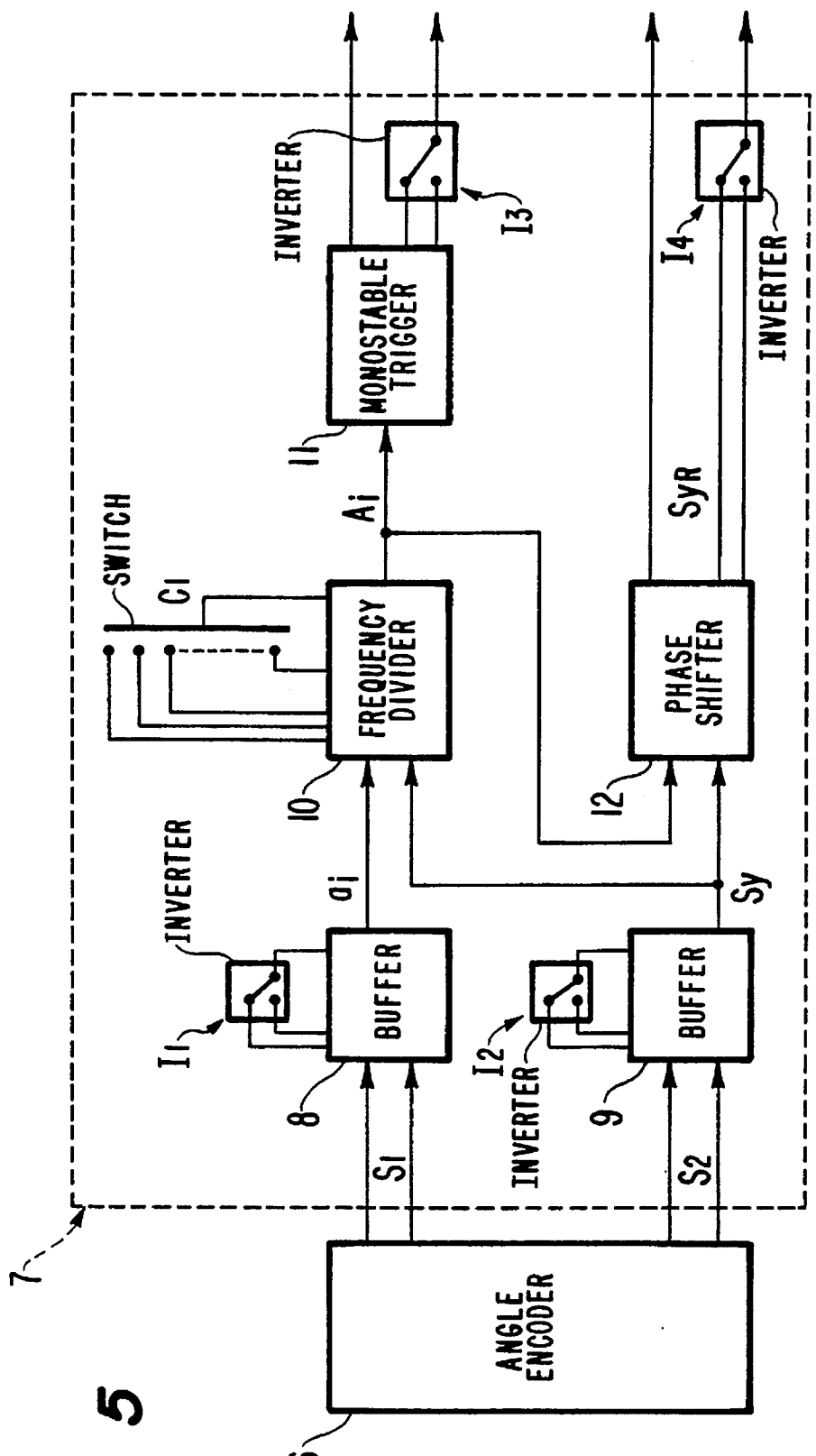
FIG. 5 schematically shows the layout of the automatic synchronization set associated with the angle encoder.

The system according to the invention (FIGS. 3–5) is used for controller an engine M provided with an angular encoder means 6 associated with an interface 7 for matching the angular coding signals.

Figure 6A:
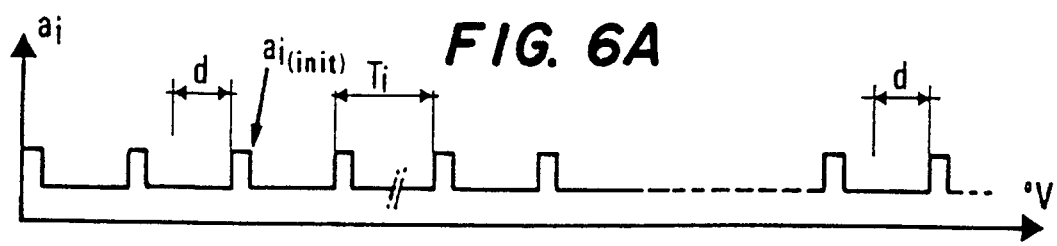
FIGS. 6A to 6D show chronograms of signals coming from the previous synchronization set.

The angular encoder means which are generally used may be gear wheels or "targets" contained in the engine (on the engine flywheel for example) or angle encoders driven thereby. The angular encoder means continuously produce, on a first output s1, pulse trains ai, each one of them corresponding to a predetermined incrementation of the angle of crank 4 (FIG. 6A). This angular increment may range, according to the angle encoder used, between several degrees crank angle (°CA) (target used for automobiles) and a fraction of a °CA (added angle encoders commonly used in research laboratory equipments for example).

At a second output, the angular encoder means produce, once per crankshaft revolution, synchronization pulses Sy corresponding for example to a missing tooth on a gear wheel. They are not necessarily in phase with pulses ai, but their phase shift d with respect to these pulses is set from the construction. Previous measurings also allow their phase shift d with respect to the top dead center PMH to be known.

Interface 7 (FIG. 5) includes two buffer elements 8, 9 receiving respectively the signals s1 and s2 delivered by angle encoder 6, for insulating electrically therefrom the system according to the invention, each one of them being provided with an inverter I1, I2 for selecting either a rising pulse front or a descending front. The signals coming from the two buffer elements 8, 9 are applied to a frequency divider 10 allowing the angular period Ti of the angular pulses ai produced by angular encoder 6 to be changed by means of a switch C1.

This change may for example be used for bringing this angular period back to a working period kTi suited to the analog-to-digital converters 22 (every °CA for example). For the development of an injection computer carried out in a research laboratory for example, equipped with an angle encoder 6 delivering pulses with a very short period (1/10th°CA for example), switch C1 may also be used to select a sufficient longer working period kTi in view of the accuracy required for computing the PMI and the stability thereof.

Figure 6B:
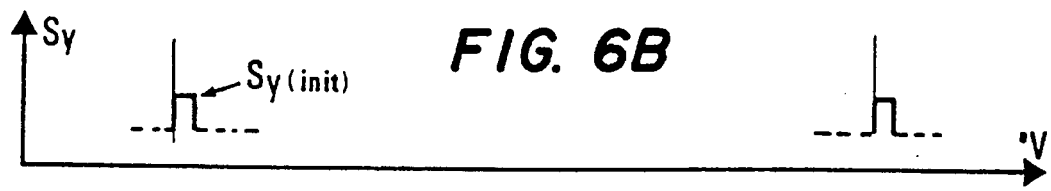
Figure 6C:
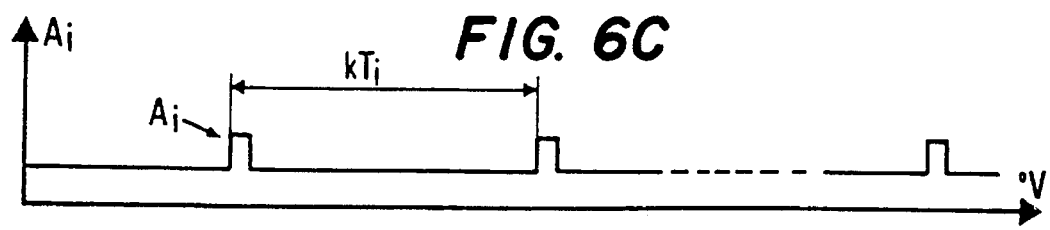

Divider 10 thus selects a pulse Ai every k pulses ai from an initial pulse ai(init). This initial pulse (FIG. 6A) is selected from the start-up as the pulse coming immediately after the detection of the first pulse Sy(init) received by encoder 6 (FIG. 6B). Divider 10 thus produces pulses Ai (FIG. 6C).

Figure 6D:
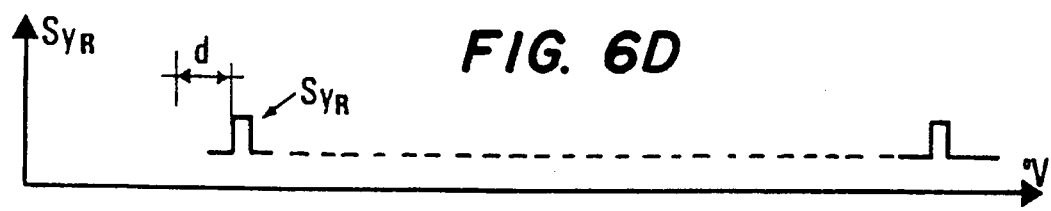

Pulses Ai coming from divider 10 are shaped in a monostable trigger circuit 11 on the one hand and applied on the other hand to a phase shifter 12. The phase shifter is suited for shifting the synchronization pulses Sy coming from buffer 9 in order to remove shift d (FIG. 6D) and to phase them (pulses SyR) with those coming from divider 10. Two inverters I3, I4 associated respectively with the monostable trigger circuit 11 and phase shifter 12 allow the rising or the descending front of the synchronized pulses produced to be selected.

Engine M is also provided with pressure detectors 13 which measure the pressure prevailing at any time of the cycle in the combustion chamber of the cylinder or of each one of them (FIG. 3). In case the engine is equipped with a fuel feed system provided with one or several needle fuel injectors 15, a detector 14 for measuring the lift height of each needle may also be included. The engine may further be equipped possibly with accelerometers 16 (FIG.4) or with any other detector (not shown) such as a knock detector for example.

The signals delivered by the pressure, the acceleration, possibly the needle lift and the knock detectors are applied to amplifier means 17 for matching the amplitude levels of the signals measured. The signals delivered by amplifier means 17 and by interface 7 are transmitted to a processer 18 computing in real time various physical parameters indicative of the running of the engine, notably various mean indicated pressure values PMI and their respective stability factors S, the maximum pressure measured during each cycle Pmax, the variation P(V), the arc of lift of the injector needle, etc, as described hereafter.

The data produced are then transmitted to the storage means of an injection computer 19 so as to make up multidimensional mappings separately for each cylinder or common to some of them, which are notably used to produce the signals for controlling injectors 15 and ignition plugs 20 of the engine.

Processer 18 (FIG. 4) includes a central unit 21 of the signal processor type or DSP controlled by a clock H. The signals coming from the amplifier means 17 are applied to central unit 21 by means of an analog-to-digital converter unit 22 including several converters with a gain between 1 and $10^4$.

Two memory modules 23, 24 are associated with central unit 21, where the computing programs for the various physical parameters sought, such as PMI, Pmax, etc, are respectively available, as well as one or several pre-established tables T(i) giving the value of the volume of the combustion chamber for each new angular increment Ai of angle, and which are used for computing the mean indicated pressure PMI by means of angle encoder 6.

Figure 8A:
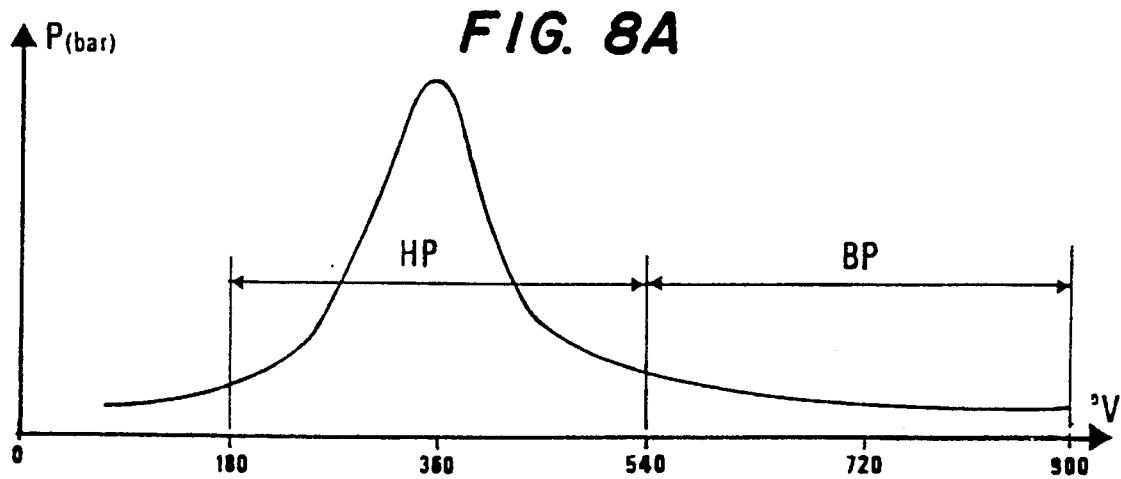
FIGS. 8A and 8B show a similar example in the case of a four-stroke engine.
Figure 8B:
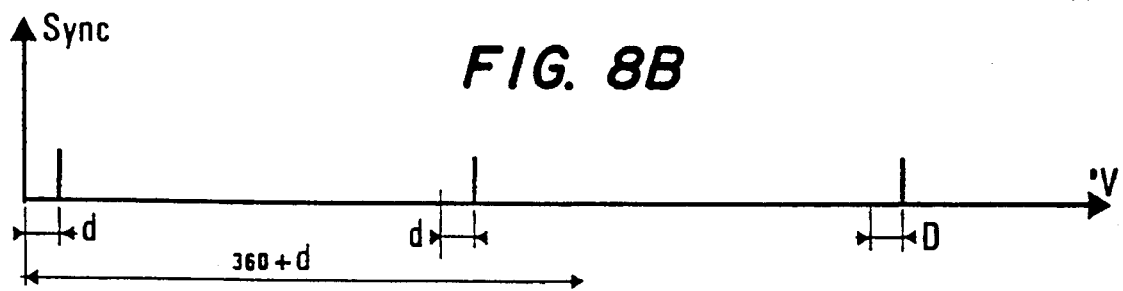
Figure 7A:
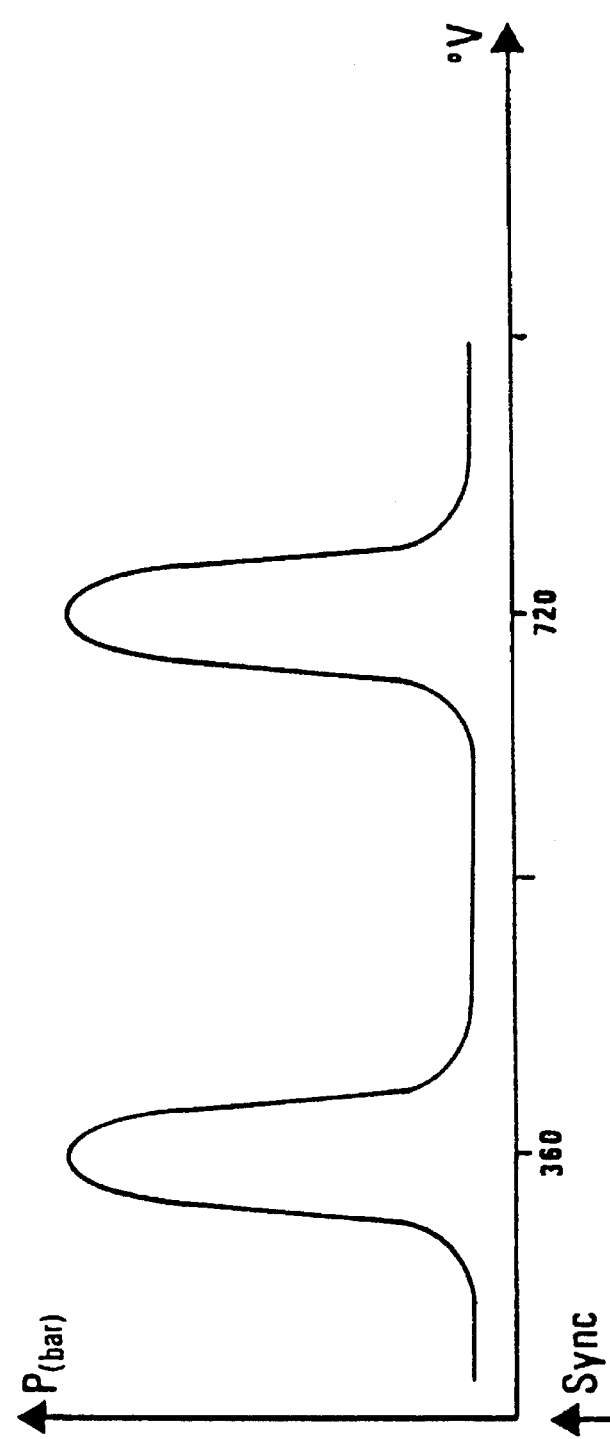
FIGS. 7A and 7B show a variation example, during a cycle, of the pressure prevailing in a cylinder as a function of the angular position of the crankshaft, in the case of a two-stroke engine.
Figure 7B:
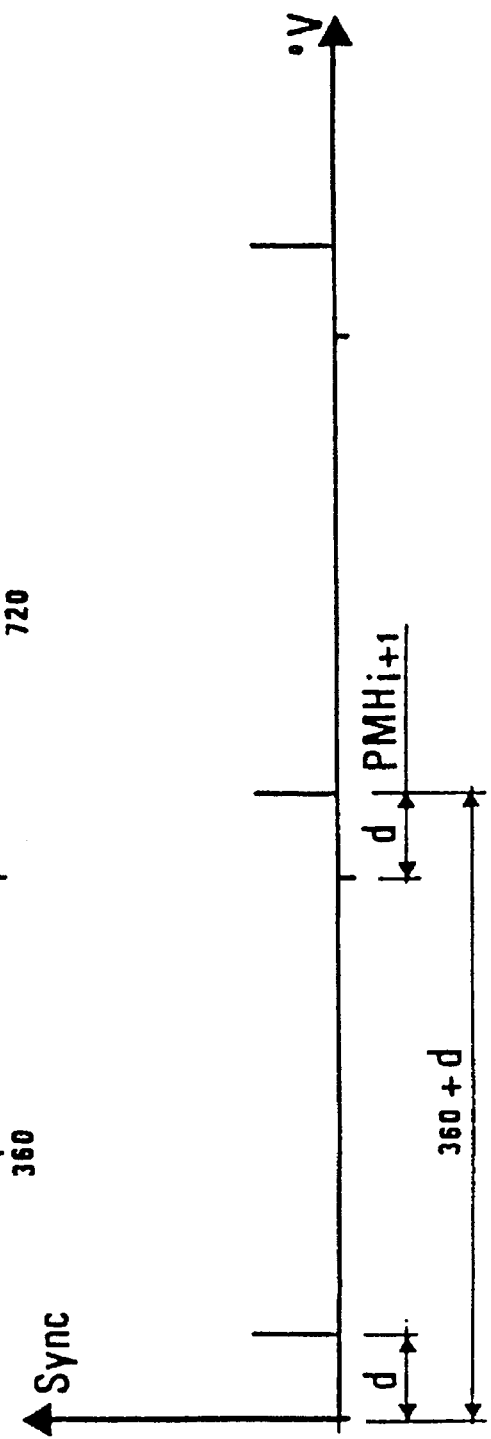
Figure 9:
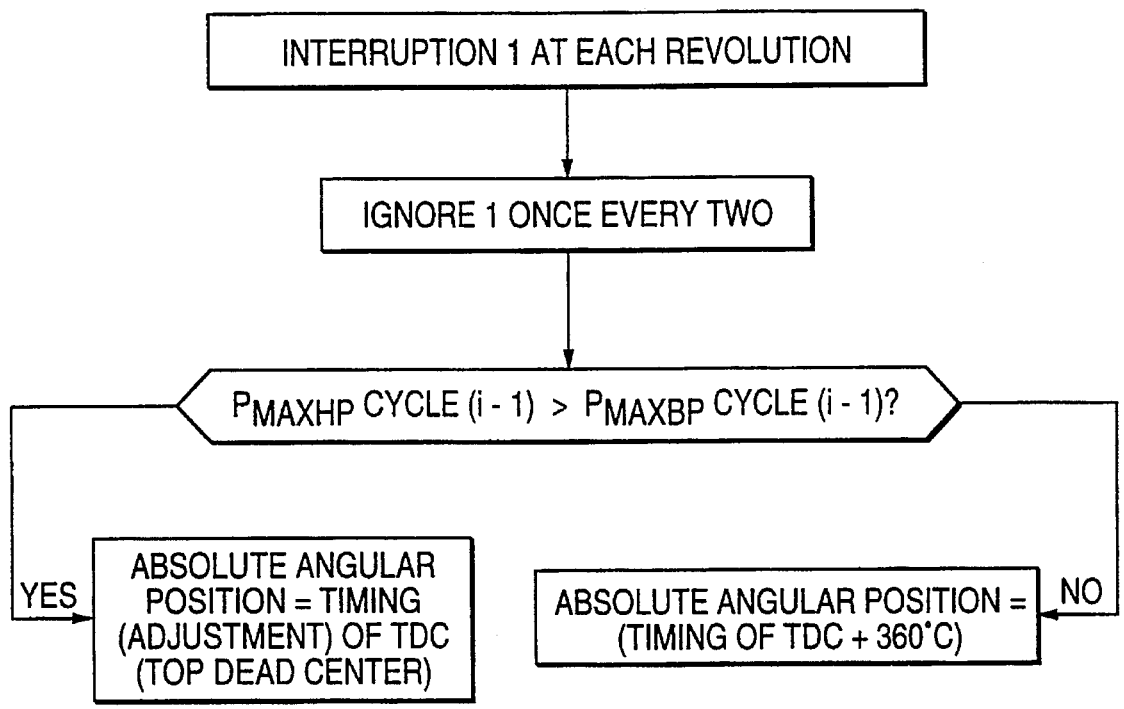
FIGS. 9–14 are flowcharts of various processings performed in accordance with the present invention.
Figure 12:
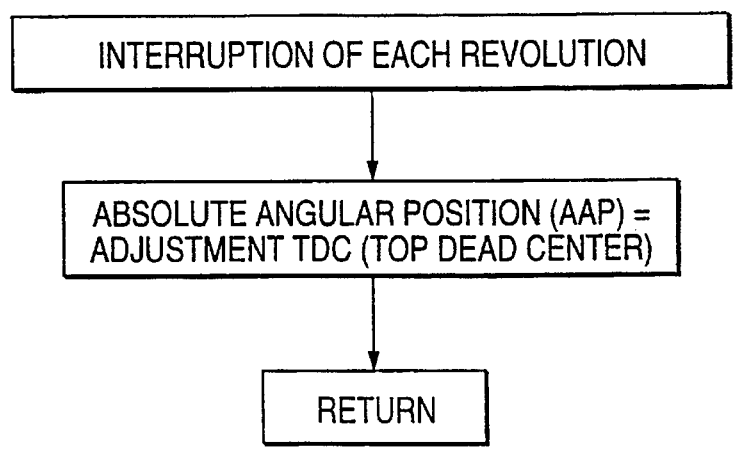
Figure 10:
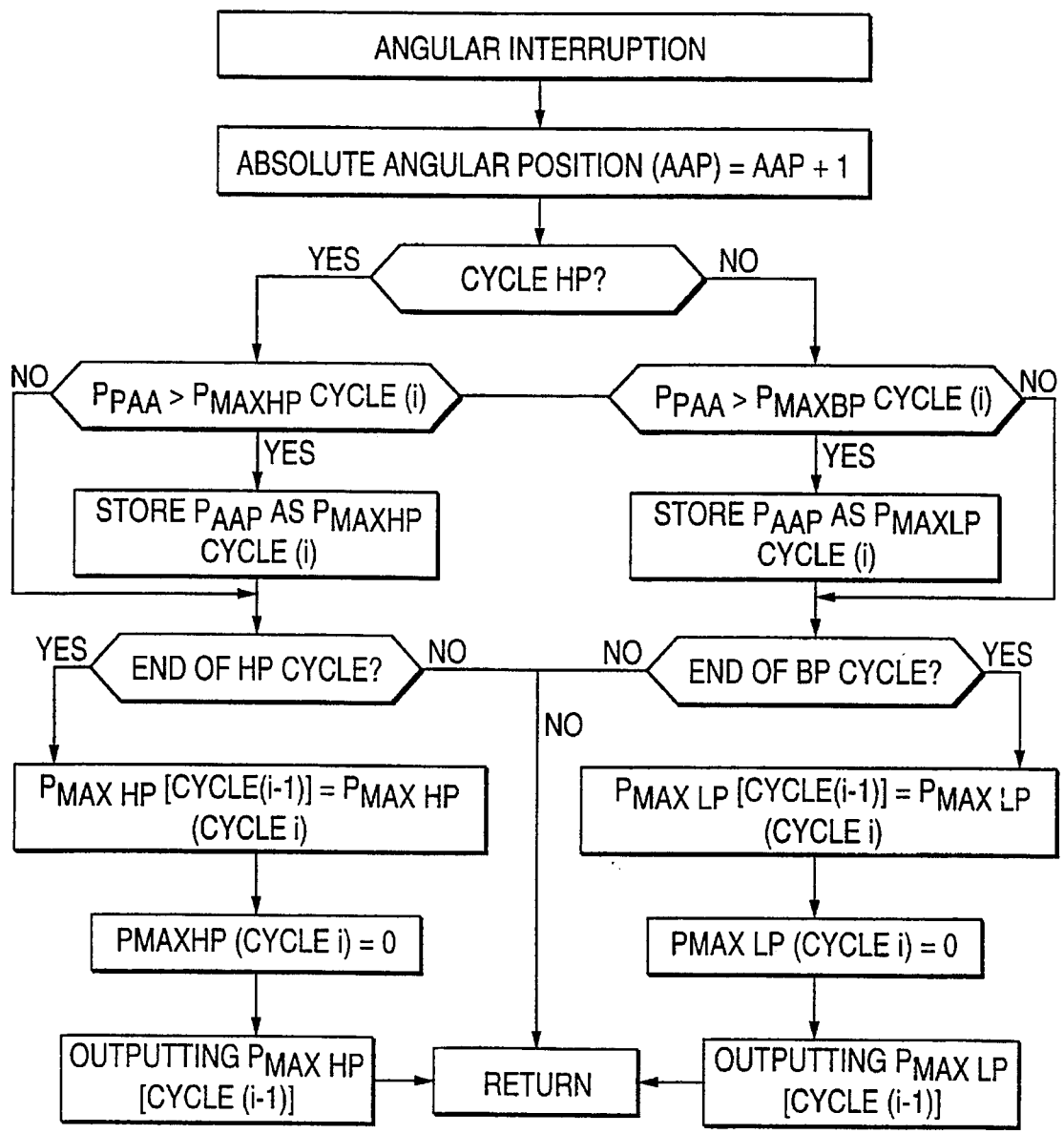
Figure 11:
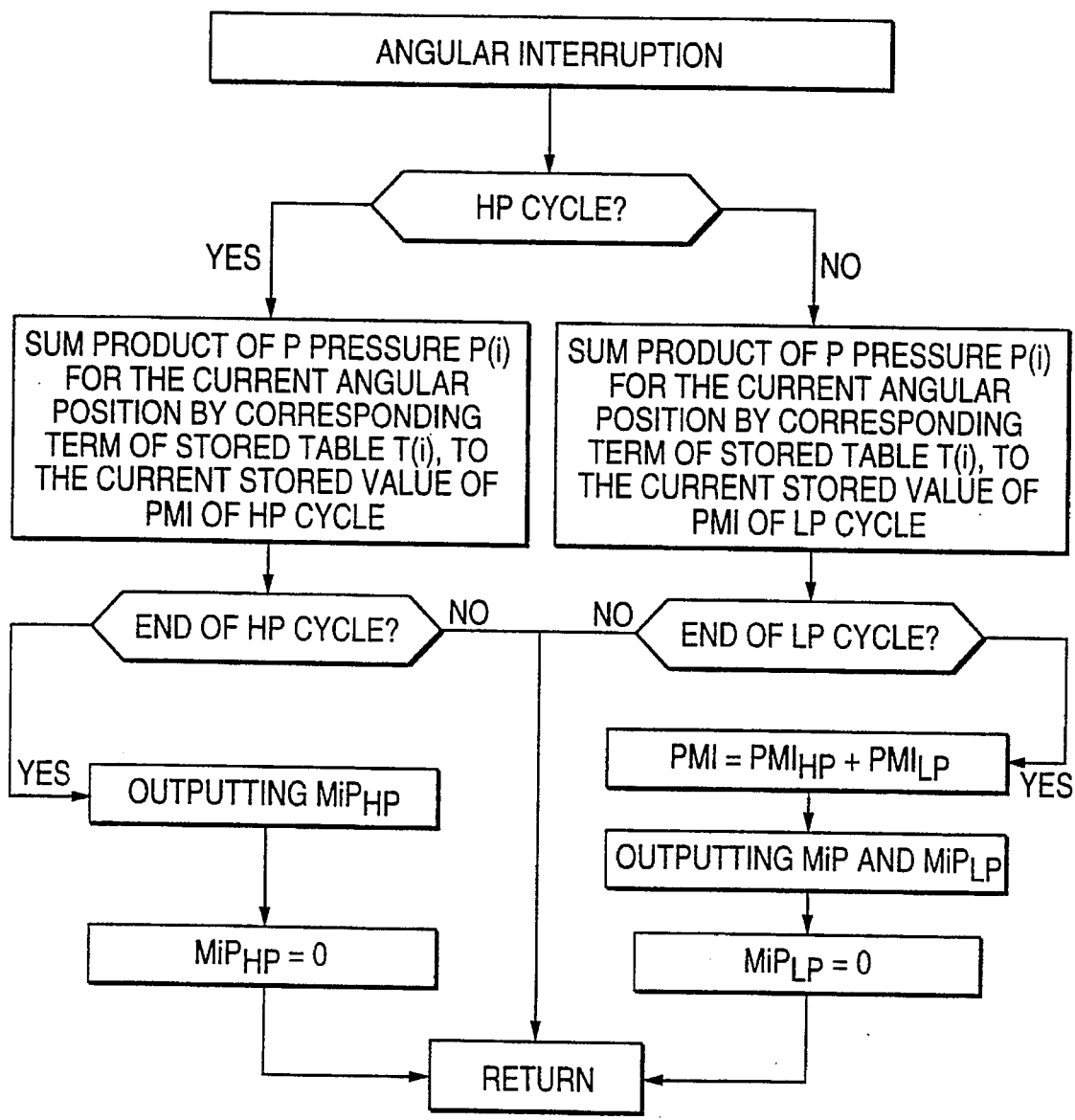
Figure 13:
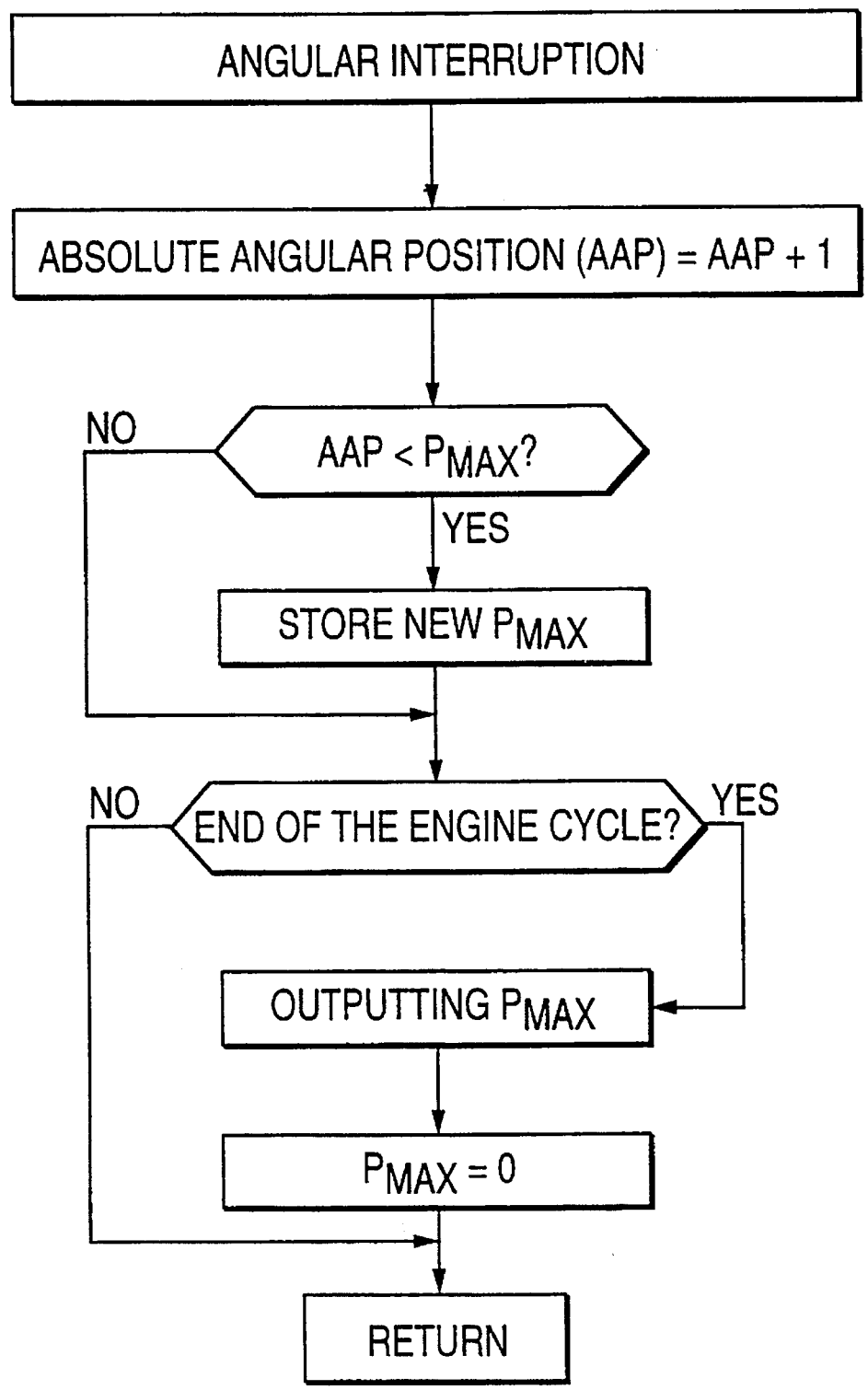
Figure 14:
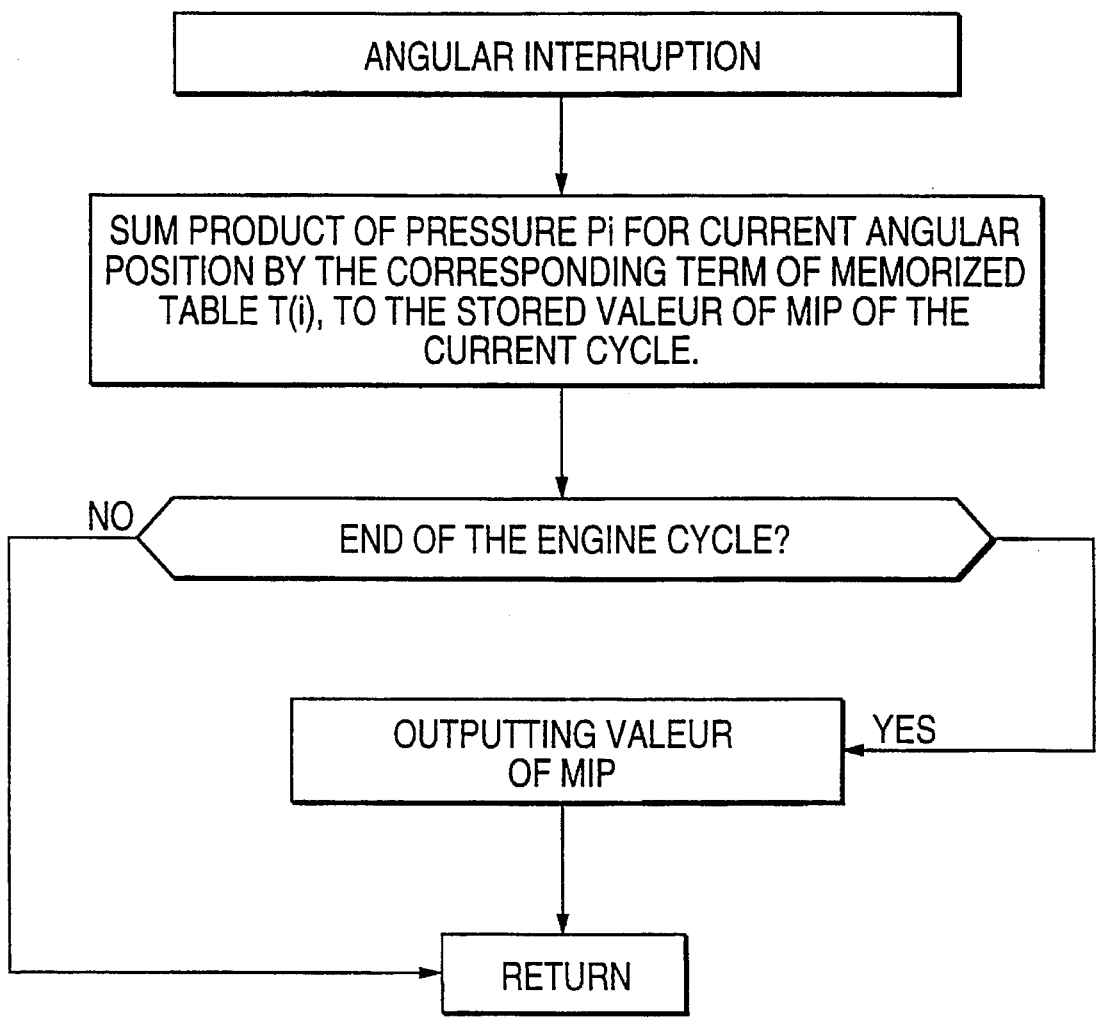

The value of the time lag D (previously determined) between (FIGS. 7, 8) the top dead center PMH and the pulse Sy.R at each revolution (FIG. 5) coming from interface 7 is inputted into central unit 21 with the aid of coding wheels 25 and by means of a matching element 26. This value is for example the number of angular pulses Ai produced between these two times.

In the case of a two-stroke engine where a crankshaft revolution corresponds to an engine cycle (FIGS. 7A, 7B), it is known non-ambiguously how to position each pulse Sy delivered by angle encoder 6 within this cycle.

On the other hand, if it is a four-stroke engine (FIGS. 8A, 8B), it is impossible to know a priori, from the starting of the engine, with no other information, if the first pulse Sy to arise, delivered by the encoder, should be associated with the low-pressure part of the cycle or with the high-pressure part thereof.

This positioning of the pulses Sy within each cycle are indispensable for the accurate computation of the running parameters of the engine and the system according to the invention is designed to remove this uncertainty by detecting, in the case of a four-stroke engine, the position of the angular coding pulses Ai delivered by interface 7 with respect to the time when the pressure in the combustion chamber reaches its maximum value with this time being necessarily situated during a high-pressure cycle part.

The principle used thus consists in measuring the maximum pressure in the combustion chamber during the first two cycle parts and either in keeping the synchronization pulse of the first part if the maximum pressure recorded is higher than that recorded during the next one or, in the opposite case, in keeping as a reference the synchronization pulse of the second part.

The programs inputted in memory module 23 are determined according to the flowcharts of FIGS. 9–14. Discrimination of the cycles and determination of the various parameters PMI, Pmax, Pmin, PMIHP, PMIBP for a four-stroke engine are performed by central unit 21 in accordance with the flowcharts of FIGS. 9–11. Angular location and determination of parameters Pmax and PMI for a two-stroke engine are performed similarly in accordance with flowcharts of FIGS. 12–14.

The results produced by central unit 21 are applied on the one hand to a set 27 of digital-to-analog converters in order to be used notably in injection computer 19 (FIG. 3), and on the other hand to buffer memories 28.

We claim:

1. A data acquisition and processing system for controlling running cycles of a two-stroke or four-stroke internal-combustion engine comprising:

a crankshaft and at least one combustion chamber having at least one cylinder and a piston, an angular encoding means for producing pulses indicative of angular increments of the crankshaft and cycle synchronization pulses at each revolution thereof, means for delivering angular increments at regular angular intervals, a sensor for sensing at least pressure values in each combustion chamber, a measuring signal acquisition set including means for acquisition of the pressure values, a digital processor including storage means for storing parameters of the engine, means for locating automatically a true angular position of the crankshaft within each cycle by reference to pressure variations in the at least one combustion chamber, means for phasing the synchronization pulses with the angular increments, means for calculating in real time a mean indicated pressure PMI in the at least one combustion chamber at each one of successive cycles of the engine and a control for controlling at least from the calculated mean indicated pressure PMI optimum running parameters for the engine, and angular locating means for applying to the digital processor data relative to a position of the cycle synchronization pulses with respect to top dead center of the piston.

2. A system as claimed in claim 1 wherein:

the digital processor includes means for calculating the mean indicated pressure PMI in the at least one combustion chamber from a set of instantaneous pressure values acquired during each running cycle; and means for calculating a stability factor ST of the mean indicated pressure PMI in each cylinder from a set of successive pressure values.

3. A system as claimed in claim 1 wherein:

the measuring signal acquisition set includes a plurality of inputs for collecting simultaneously signals from pressure sensors associated with a plurality of cylinders, and the digital processor includes means for determining in real time and simultaneously at least the mean indicated pressure PMI in the plurality of cylinders.

4. A system as claimed in claim 1 wherein:

the measuring signal acquisition set includes a plurality of inputs for collecting signals coming from the sensor indicative of at least one parameter with the at least one parameter being pressures in each cylinder, induction and exhaust pressures, injector needle lifts, accelerations, temperatures, engine torque, or knocking detection.

5. A system as claimed in claim 4 wherein:

the control determines at least one optimum running parameter of the engine as a function of the at least one parameter.

6. A system as claimed in claim 1 wherein:

the means for delivering angular increments includes a divider provided with means for adjusting a division factor and a phase shifter, the divider and the phase shifter co-operating to produce angular increments at an angular frequency submultiple of that of angular increments from the angular encoding means and synchronous with the cycle synchronization pulses.

7. A system as claimed in claim 1 wherein:

the digital processor includes means for offsetting automatically pulses indicative of angular increments of a crankshaft angle as a function of detection time of a maximum pressure measured in the at least one combustion chamber.

8. A system as claimed in claim 1 wherein:

the storage means includes a storage unit for storing predetermined volume variations of each combustion chamber as a function of an angle of rotation of the crankshaft.

9. A system as claimed in claim 1 wherein:

the digital processor includes means for determining in real time and simultaneously for each of the cylinders at least one parameter with the at least one parameter being mean indicated pressure PMI of each combustion cycle, mean indicated pressures for high pressures and mean indicated pressure for low pressures respectively in high-pressure parts and low-pressure parts of each combustion cycle, maximum pressures and minimum pressures measured respectively during one combustion cycle, and respective stability factors ST.

10. A system as claimed in claim 1 wherein:

the digital processor includes means for positioning automatically high-pressure cycle parts by reference to a maximum pressure measured in each combustion chamber.

11. A process for optimizing running of an internal-combustion engine having either two-stroke or four-stroke combustion cycles including a crankshaft, at least one combustion chamber having a cylinder and a piston, detecting means for measuring at least pressures in the at least one combustion chamber and angular encoding means producing pulses ai indicative of angular variations of the crankshaft and cycle synchronization pulses at each revolution thereof, comprising:

producing the pulses ai at determined angular intervals within each combustion cycle;

locating a position of the synchronization pulses with respect to a top dead center of the piston;

readjusting automatically angular pulses generated by the angular encoding means in order to make the angular pulses agree with a part of a combustion cycle at which the angular pulses are produced;

determining in real time, during each cycle and for each combustion chamber, parameters including at least values of mean indicated pressure PMI and stability factors ST of the mean indicated pressure PMI values;

providing mappings including the parameters; and controlling the engine to have a specified fuel consumption or a maximum engine torque, and a minimum rate of discharge of harmful exhaust gases from the engine in accordance with the mappings.

* * * * *